(12) United States Patent
Brenner et al.

(10) Patent No.: US 11,901,782 B2
(45) Date of Patent: Feb. 13, 2024

(54) MAGNETICALLY ACTIVE UNIT OF A ROTATING MULTIPHASE ELECTRIC MACHINE

(71) Applicant: Flender GmbH, Bocholt (DE)

(72) Inventors: Robin Brenner, Kirchham (DE);
Dominik Kohlmeier, Pocking (DE);
Manuel Oberneder, Büchlberg (DE);
Norbert Schönbauer, Bad Füssing (DE); Karl-Heinz Senninger, Egglham (DE)

(73) Assignee: Flender GmbH, Bocholt (DE)

( * ) Notice: Subject to any disclaimer, the term of this patent is extended or adjusted under 35 U.S.C. 154(b) by 508 days.

(21) Appl. No.: 17/278,597

(22) PCT Filed: Sep. 17, 2019

(86) PCT No.: PCT/EP2019/074808
§ 371 (c)(1),
(2) Date: Mar. 22, 2021

(87) PCT Pub. No.: WO2020/064416
PCT Pub. Date: Apr. 2, 2020

(65) Prior Publication Data
US 2021/0359563 A1 Nov. 18, 2021

(30) Foreign Application Priority Data
Sep. 24, 2018 (EP) .................................... 18196280

(51) Int. Cl.
*H02K 3/12* (2006.01)
*H02K 3/48* (2006.01)
(Continued)

(52) U.S. Cl.
CPC ................. *H02K 3/12* (2013.01); *H02K 3/48* (2013.01); *H02K 17/12* (2013.01); *H02K 7/183* (2013.01)

(58) Field of Classification Search
CPC combination set(s) only.
See application file for complete search history.

(56) References Cited

U.S. PATENT DOCUMENTS

| 2011/0198960 | A1  | 8/2011  | Tang et al. | |
|---|---|---|---|---|
| 2014/0125185 | A1* | 5/2014  | Suzuki | H02K 3/28 310/198 |
| 2015/0311719 | A1* | 10/2015 | Andresen | H02P 9/02 290/44 |

FOREIGN PATENT DOCUMENTS

| CN | 101151782 A | 3/2008 |
|---|---|---|
| CN | 105680653 A | 6/2016 |

(Continued)

OTHER PUBLICATIONS

*PCT International Search Report and Written Opinion of International Searching Authority dated Oct. 28, 2019 corresponding to PCT International Application No. PCT/EP2019/074808 filed Sep. 17, 2019.*

(Continued)

*Primary Examiner* — Thomas Truong
(74) *Attorney, Agent, or Firm* — Henry M. Feiereisen LLC (57) ABSTRACT

A magnetically active unit of an electric machine with at least two poles includes a laminated core with slots, and at least one winding for each of the phases. The windings have an electric conductor which forms coil groups in the slots. The coils of the coil groups are formed with at least two sections of the electric conductors of at least one of the windings and are arranged so as to be electrically insulated from each other in the grooves. At least one first coil group (Continued)

of the coil groups of one of the windings has a first number of coils which deviates from a second number of coils of a second coil group of the coil groups of the same winding.

14 Claims, 4 Drawing Sheets

(51) Int. Cl.
  *H02K 17/12* (2006.01)
  *H02K 7/18* (2006.01)

(56) References Cited

FOREIGN PATENT DOCUMENTS

| DE | 600 18 364 T2 | 12/2005 |
| DE | 10 2012 202 735 A1 | 8/2013 |
| EP | 2 940 860 A1 | 11/2015 |
| EP | 3 252 926 A1 | 12/2017 |
| GB | 1 375 957 | 12/1974 |
| WO | WO 2013/034313 A2 | 3/2013 |

OTHER PUBLICATIONS

English Translation of Chinese Search Report dated Apr. 3, 2023 with respect to counterpart Chinese patent application 201980062520.6.

* cited by examiner

MAGNETICALLY ACTIVE UNIT OF A ROTATING MULTIPHASE ELECTRIC MACHINE

CROSS-REFERENCES TO RELATED APPLICATIONS

This application is the U.S. National Stage of International Application No. PCT/EP2019/074808, filed Sep. 17, 2019, which designated the United States and has been published as International Publication No. WO 20201064416 A1 and which claims the priority of European Patent Application, Serial No. 18196280.4, filed Sep. 24, 2018, pursuant to 35 U.S.C. 119(a)-(d).

BACKGROUND OF THE INVENTION

The present invention relates to a magnetically active unit of a rotating multiphase electric machine having at least two poles, with a laminated core, which has a plurality of slots, and at least one winding for a respective one of the phases of the electric machine, wherein the windings each have at least one electric conductor, which, to form coil groups assigned to the respective poles, is arranged at least partially in an insulated manner in a plurality of predetermined slots of the plurality of slots of the laminated core thus forming coils of the coil groups and wherein, in the slots, at least two sections of the electric conductors of at least one of the windings are arranged electrically insulated from one another. The invention further relates to a stator for a rotating electric machine and also to a rotor for a rotating electric machine and a rotating electric machine having a stator and a rotor rotatably mounted in an opening of the stator.

Generic electric machines, stators and also rotors therefor and corresponding magnetically active units are in principle well known from the prior art so that no separate publication is required to demonstrate this. This in particular applies to the magnetically active unit, which can be provided in the stator and/or in the rotor.

The magnetically active unit is a unit that serves to provide a magnetic field in a predeterminable manner so that the rotating electric machine can be used as intended. Generally, a corresponding magnetically active unit is provided in both the stator and the rotor. However, it can also be provided that, in particular in the case of asynchronous machines, the magnetically active unit is only provided in a stator, for example in the case of a squirrel-cage rotor or the like.

In the case of a rotating electric machine, a stator is in principle provided as a stationary part which generally provides a substantially circular opening for receiving a rotating part in the form of a rotor. The rotor is rotatably mounted in the opening, wherein an air gap is formed between the rotor and the stator.

The rotating electric machine is a device that converts electric energy into mechanical energy, in particular kinetic energy, in motor mode and/or mechanical energy into electric energy in generator mode. The motion is generally a rotary motion implemented by the rotor. In contrast to the rotor, the stator is generally arranged in a non-rotatable manner, which means that a rotary motion is a rotary motion of the rotor relative to the stator.

The stator and the rotor of the rotating electric machine are linked by means of a magnetic flux as a result of which, in motor mode, the dynamic effect or the torque to drive the rotor in a rotary manner relative to the stator is generated. In generator mode, mechanical energy or a torque supplied to the rotor is converted into electric energy in the form of rotation. For this purpose, the stator, and frequently also the rotor, in each case have a winding through which an electric current flows. In the stator or rotor, the winding can also be replaced, or at least partially supplemented, by a permanent magnet.

Rotating electric machines of the generic type are, for example, rotating-field machines connected to a polyphase, in particular three-phase, electric AC voltage network, for example asynchronous machines, synchronous machines, synchronous machines with a damper cage or the like.

The magnetically active unit has the laminated core, which in turn consists of individual ferromagnetic sheets that are electrically insulated from one another. Depending upon the intended use, the sheets can also be referred to as dynamo sheets, motor sheets, transformer sheets or the like. Such sheets are subject to standardization, for example EN 10106, EN 10107 or the like.

The slots, which are usually formed radially with respect to a machine axis of the rotating electric machine, are generally embedded in the laminated core. The slots are generally formed on a surface of the laminated core directed toward the air gap between the stator and the rotor. The electric conductors of the windings or coil groups are arranged in these slots so that the required magnetic field is provided in a predeterminable manner in dependence on an electric current flowing through the electric conductors during operation as intended. Thus, the winding of the stator is frequently implemented as integrated in the laminated core.

Thus, the stator usually absorbs the reaction in respect of a rotor torque and is braced against a support in order to be arranged in a non-rotatable manner. The brace can be formed by a foundation or the like. Therefore, the laminated core designates a body made of ferromagnetic materials and thus with a layered magnetizable structure. Thus, the aim of the laminated core is, in conjunction with the current-carrying conductors of the coil groups, to bundle and guide the magnetic flux.

At least in the region of the arrangement in the slots, the at least one electric conductor of the respective one of the coil groups is formed as electrically insulated or arranged in electrically insulated manner in the slots. The insulation can be formed by an electrically insulating coating, for example a lacquer, an insulating film arranged on an external circumference of the electric conductor, and/or the like. Moreover, the electric insulation can obviously also be formed by insulation elements, which, in the arranged state, are positioned in the slot between the laminated core and the conductor. This can, for example, entail insulation strips made of a suitable material that is able to achieve adequate electric insulation during operation as intended, for example mica or the like.

The use of rotating electric machines is widespread. Such electric machines are also increasingly used in wind energy applications. Here, in particular doubly fed asynchronous machines in which the rotor is correspondingly supplied with electric energy by means of a suitable energy transducer, for example a frequency converter or the like have been found to be advantageous. Herein, it has been found that behavior with regard to the electric properties of the rotating electric machine can inter alia be dependent on a winding transformation ratio in generator mode. The winding transformation ratio is a regular customer requirement and should usually be adhered to within narrow limits. The winding transformation ratio can be influenced by configurations of the windings in the stator and in the rotor, in particular if the windings in the stator and in the rotor are formed differently from one another.

For use in wind and tidal generators, DE 10 2012 202 735 A1, for example, discloses a dynamoelectric machine with a single-layer fractional-slot winding.

The setting of the winding transformation ratio is subject to certain requirements with respect to implementable configurations of the number of slots and the windings, circuits and chordings in the stator and in the rotor. For this reason, some winding transformation ratios cannot always be implemented with standard configurations as a result of which it is not always possible to achieve corresponding customer requirements and the associated optimum use of the wind turbine.

The invention is based on the object of developing a magnetically active unit, in particular for a doubly fed asynchronous machine, to the effect that an improved configuration can be achieved, in particular in respect of transformation ratios.

SUMMARY OF THE INVENTION

The solution proposed by the invention entails a magnetically active unit, a rotor, a stator and a rotating electric machine as claimed in the independent claims.

Advantageous developments result from features of the dependent claims.

In respect of a generic magnetically active unit, it is in particular proposed that at least a first one of the coil groups of one of the windings has a first number of coils which is different from a second number of coils of a second one of the coil groups of the same winding.

With respect to a generic rotor and a generic stator, it is in particular proposed that this has a magnetically active unit according to the invention.

With respect to a generic rotating electric machine, it is in particular proposed that this has a stator and/or a rotor according to the invention.

The Invention is based on the idea that, in particular when considering an even number of poles of the magnetically active unit, the differing number of coils of a respective one of the coil groups can influence the magnetic field such that it is, for example, possible to set the winding transformation ratio in an improved manner thus, for example, enabling customer requirements and hence improved utilization of a wind energy application to be achieved. As a result, the invention enables the implementation of a distributed two-layer fractional-slot wave and/or preformed coil lap winding in the rotor and/or also in the stator such that additional electric winding transformation ratios can be implemented and hence customer requirements can be met in a more flexible manner. The distributed two-layer fractional-slot wave and/or preformed coil lap winding of the magnetically active unit can be characterized by a non-Integer number of holes.

Herein, the number of holes results from the number of slots of the magnetically active unit in relation to a product of the phases of the electric machine and the number of poles. It can, for example, be stated in the form $$q2=q+(q_z/q_N),$$

wherein q2 is the number of holes, q is the number of coils. $q_z$ is the number of phases, and $q_m$ is the number of poles. wherein q is an integer, in particular a natural number. In particular in the case of distributed two-layer fractional-slot wave windings of magnetically active units arranged in the rotor, the division of the coil groups should be taken into account in order to facilitate improved implementation of the wave winding.

For example, a distributed two-layer fractional-slot wave winding in a 4-pole rotating electric machine with a number of holes q+(¼), also called a quarter-slot winding, can have three coil groups with a number of coils q and one coil group with a number of coils q+1. In order to ensure the feasibility of the wave winding, when the phase inputs and circuit are implemented on the short connection end of the winding, the bars should preferably be offset in the lower layer of a coil group in the positive direction of circulation by more than one pole pitch with respect to the bars in the upper layer of the same coil group. If the phase inputs and the circuit are implemented on the long connection end of the winding, the bars in the lower layer of a coil group in the positive direction of circulation should be less than one pole pitch away from the bars in the upper layer of the same coil group.

A distributed two-layer fractional-slot wave winding in a 4-pole rotating electric machine with a number of holes q+(¾) can, for example, have one coil group with a number of coils q and three coil groups with a number of coils q+1. To ensure the feasibility of the wave winding, during the implementation of the phase inputs and the circuit on the short connection end of the winding, the bars should preferably be offset in the lower layer of a coil group in the positive direction of circulation by more than one pole pitch with respect to the bars in the upper layer of the same coil group. If the phase inputs and the circuit are implemented on the long connection end of the winding, the bars in the lower layer of a coil group in the positive direction of circulation should preferably be less than one pole pitch away from the bars in the upper layer of the same coil group.

Thus, the invention relates to a magnetically active unit of a rotating multiphase electric machine having at least two poles, with a laminated core having a plurality of slots and at least one winding for a respective one of the phases of the electric machine, wherein the windings each have at least one electric conductor, which, to form coil groups assigned to the respective poles, is arranged at least partially in an electrically insulated manner in a plurality of predetermined slots of the plurality of slots of the laminated core thus forming coils of the coil groups and wherein in the slots at least two electric conductors of at least one of the electric coils are arranged so as to be electrically insulated from one another.

The different number of coils in the coil groups of a respective one of the windings enables the magnetic field of the active unit to be influenced in such a way that flexibility can be improved, in particular increased, in respect of the winding transformation ratio. Insofar, the invention provides the possibility of further improving the functionality of the rotating electric machine. In the case of a doubly fed asynchronous machine, the functionality can preferably be improved in respect of the winding transformation ratio and hence of a standstill voltage of a rotor and a speed range. The magnetically active unit can be provided with both a stator and a rotor. Obviously, both the stator and the rotor can also have a corresponding magnetically active unit. Moreover, the number of poles in a rotor does not need to correspond to the number of poles in a stator. Depending upon requirements, a difference can also be provided here.

The sections of the electric conductors are arranged in two layers in the slots. The two-layer arrangement relates in particular to a radial direction in respect of the machine axis. This enables a particularly simple structure of the magnetically active unit to be achieved. The conductors can be arranged radially one above the other in the slots. Moreover, it is obviously also possible for the two electric conductors to be arranged in the slots directly adjacent to one another in the circumferential direction. An appropriate arrangement can be selected in accordance with the requirements, in particular taking account of further structural aspects, such as electric insulation, electric connection and/or the like. A combination thereof can also be provided. Cross-sectional areas of the conductors can be adapted to the arrangement in the slots.

A first number of coils of a respective coil group is different from a second number of coils of one of the further coil groups of the same phase. This enables the invention to be implemented in a particularly simple manner namely in that the number of coils in all coil groups are selected as different from one another. A corresponding interconnection by means of the winding overhang enables this to be implemented in a simple manner. As a result, existing basic structures of magnetically active units and existing manufacturing methods can continue to be used. Thus, the invention can also be used subsequently with existing means for the production of magnetically active units in a simple manner.

It is further proposed that the sections of the electric conductors are arranged in the slots in radial layers with respect to a machine axis, wherein a respective layer is formed by at least one of the electric conductors. The machine axis preferably corresponds to an axis of rotation of the rotor. In this way, particularly simple manufacturing of the magnetically active unit can be achieved according to the invention. For example, it can be provided that the sections of the electric conductors are arranged radially one above the other in a respective one of the slots. This can achieve a stack-like structure of the sections of the electric conductors in the respective slot within an individual slot so that a good filling factor can be achieved.

It is furthermore proposed that a coil input of a respective one of the coil groups is arranged on a respective coil of the upper layer. This enables particularly favorable access for an electric connection of the magnetically active unit. This proves to be particularly advantageous if the magnetically active unit is used in a rotor of the rotating electric machine. The coil inputs are preferably formed on a non-drive side of the rotating electric machine, in particular a doubly fed asynchronous machine. Alternatively, however, they can also at least partially be formed on a drive side of the rotating electric machine.

According to one development, it is proposed that only one single respective winding, in particular only one single electric conductor for a respective one of the windings, is provided for each of the phases. This overall enables a simple structure of the magnetically active unit, and hence also of the rotating electric machine, to be achieved. Moreover, advantages can in particular be obtained in respect of the operation of the rotating electric machine in conjunction with an energy transducer, for example an inverter, converter or the like, if only one single winding is required to be supplied with electricity for each of the phases. This also proves to be particularly advantageous for asynchronous machines intended to be used in the field of wind energy applications. As a result, a particularly favorable constellation can be achieved in particular in respect of a doubly fed asynchronous machine.

It is further proposed that the winding is formed as a wave winding. A wave winding is characterized in that successive coils in the winding path lie under successive pole pairs. Particularly favorable manufacturing and also particularly favorable provision of a magnetic field during operation as intended and a robust winding implementation can be achieved.

Finally, it is proposed that the windings are formed as preformed coil windings. The electric conductors of the windings are preferably adapted to the slots thus enabling the highest possible filling factor to be achieved. The electric conductors can be formed by electrically conductive bars which are arranged in the respective slots and electrically interconnected in a suitable manner by means of suitable winding overhangs to end faces of the rotating electric machine in order to be able to obtain the desired magnetically active unit. It proves to be particularly advantageous if the conductor bars already comprise electric insulation so that the arrangement of conductor bars in the slots simultaneously also enables the provision of suitable electric insulation from the laminated core or further electric conductors in the respective slots. Overall, existing manufacturing methods can also be used for this so that manufacturing of the magnetically active unit according to the invention can be further improved.

The advantages and effects specified for the magnetically active unit obviously apply equally to the stator or rotor equipped with the magnetically active unit and the electric machine equipped with such a stator or such a rotor and vice versa.

BRIEF DESCRIPTION OF THE DRAWING

Further advantages and features emerge from the following exemplary embodiments with reference to the attached figures. In the figures, the same reference characters denote the same features and functions.

The figures show.

DETAILED DESCRIPTION OF PREFERRED EMBODIMENTS

Figure 4:
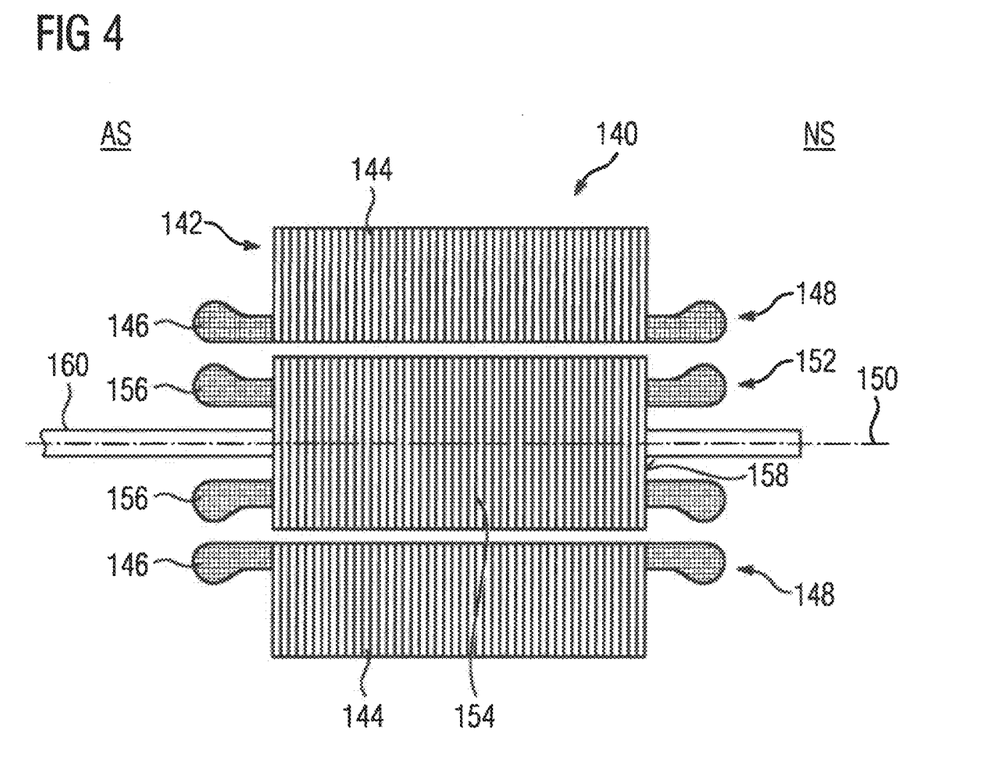
FIG. 4 a schematic sectional view of a doubly fed asynchronous machine with a rotor mounted rotatably in a stator.

FIG. 4 is a schematic sectional depiction of a rotating electric machine, which in the present case is formed as a doubly fed asynchronous machine 140 for connection to an AC voltage network, not depicted in further detail, and which has a stator 142 arranged in a non-rotatable manner. The stator 142 has a laminated stator core 144 in which a stator winding 146 is arranged. FIG. 4 shows the winding overhangs 148 of the stator winding 146 projecting longitudinally beyond the laminated stator core 144. In the present case, the section in FIG. 4 is a longitudinal section provided along an axis of rotation 150 of a rotor 152.

The rotor 152 is arranged such that is can rotate in the asynchronous machine 140 and is rotatably fixed in its position in relation to the stator 142 by means of bearings, not depicted in further detail. The rotor 152 has a laminated rotor core 154 comprising a rotor winding 156. In each case, non-designated winding overhangs are provided on end faces 158 of the laminated rotor core 154. The laminated rotor core 154 and the rotor winding 156 form a first magnetically active unit. Likewise, the laminated stator core 144 forms a second magnetically active unit with the stator winding 146.

The rotor 152 further has a rotor shaft 160. Its drive side AS is used for connection to a rotatable mechanical apparatus. The rotatable mechanical apparatus can have any desired function, for example a drive function for an industrial machine, an electrically drivable motor vehicle and/or the like. Moreover, the mechanical apparatus can obviously also be a motor driven by an internal combustion engine, a wind turbine and/or the like. Depending upon the operating mode, the asynchronous machine 140 can be supplied with mechanical energy in the form of rotary motion so that the asynchronous machine 140 can be operated in generator mode or the asynchronous machine 140 can draw electric energy via the energy supply network connected thereto and provide a torque via the rotor 152 and the rotor shaft 160 in motor mode. Slip rings, not depicted, of the rotor 152 connect the rotor winding 156 to a convertor by means of which the rotor winding 156 is supplied with electric energy in a predeterminable manner in order to form a doubly fed asynchronous machine.

In the present case, the rotor winding 156 has a separate winding 116, 118, 120 for each of the three phases that are supplied by the converter. The exemplary embodiment of the rotor winding 156 is explained below with reference to FIGS. 1 to 3. However, the exemplary embodiment is not restricted to application in a rotor but can in principle also be implemented in the stator 142.

Figure 1:
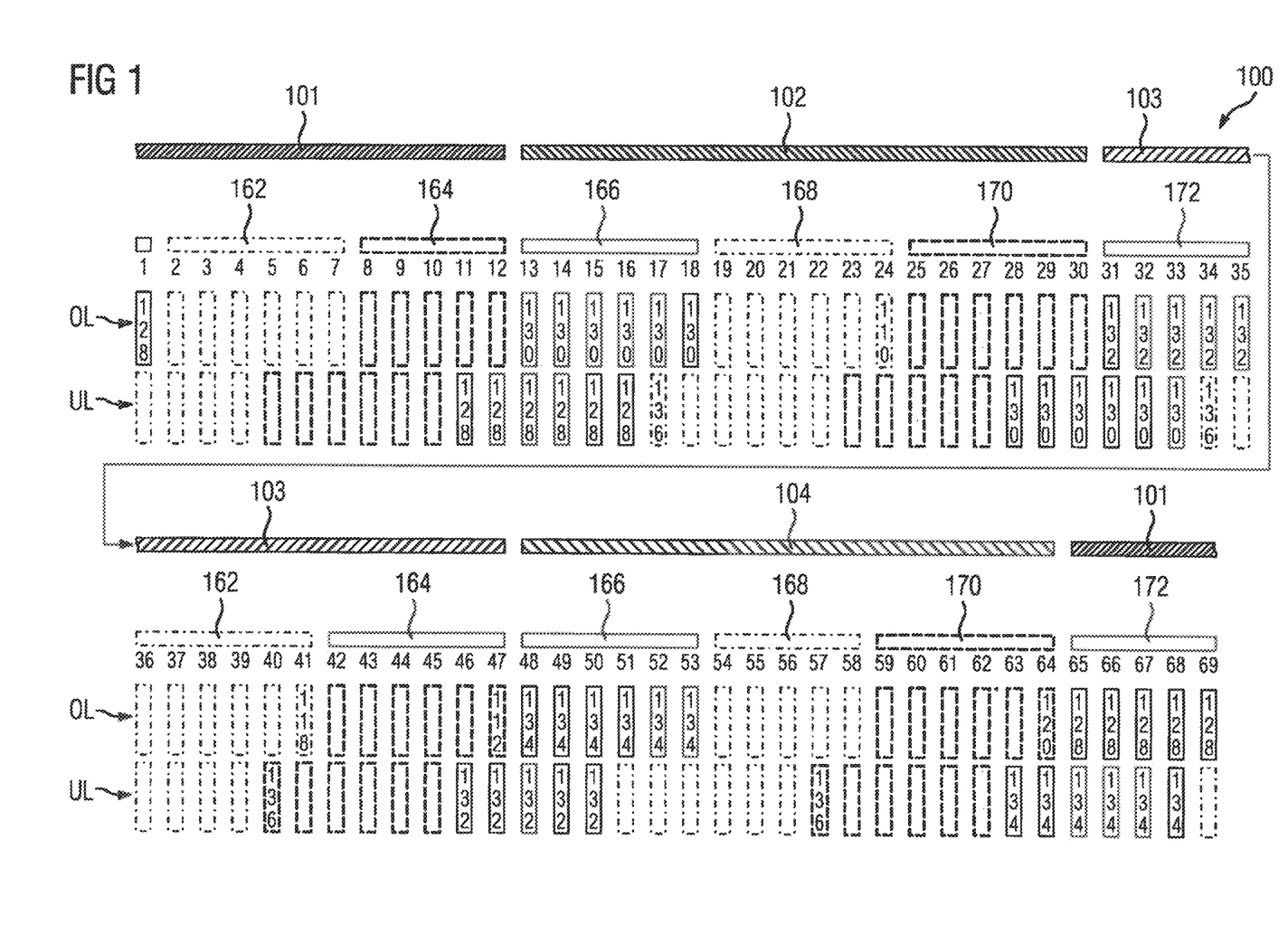
FIG. 1 a schematic depiction of slot assignments with highlighted coil groups of a two-layer fractional-slot bar wave winding with a number of holes q2=5.75 in the rotor of a four-pole doubly fed asynchronous machine for operation on a three-phase AC voltage network.
Figure 2:
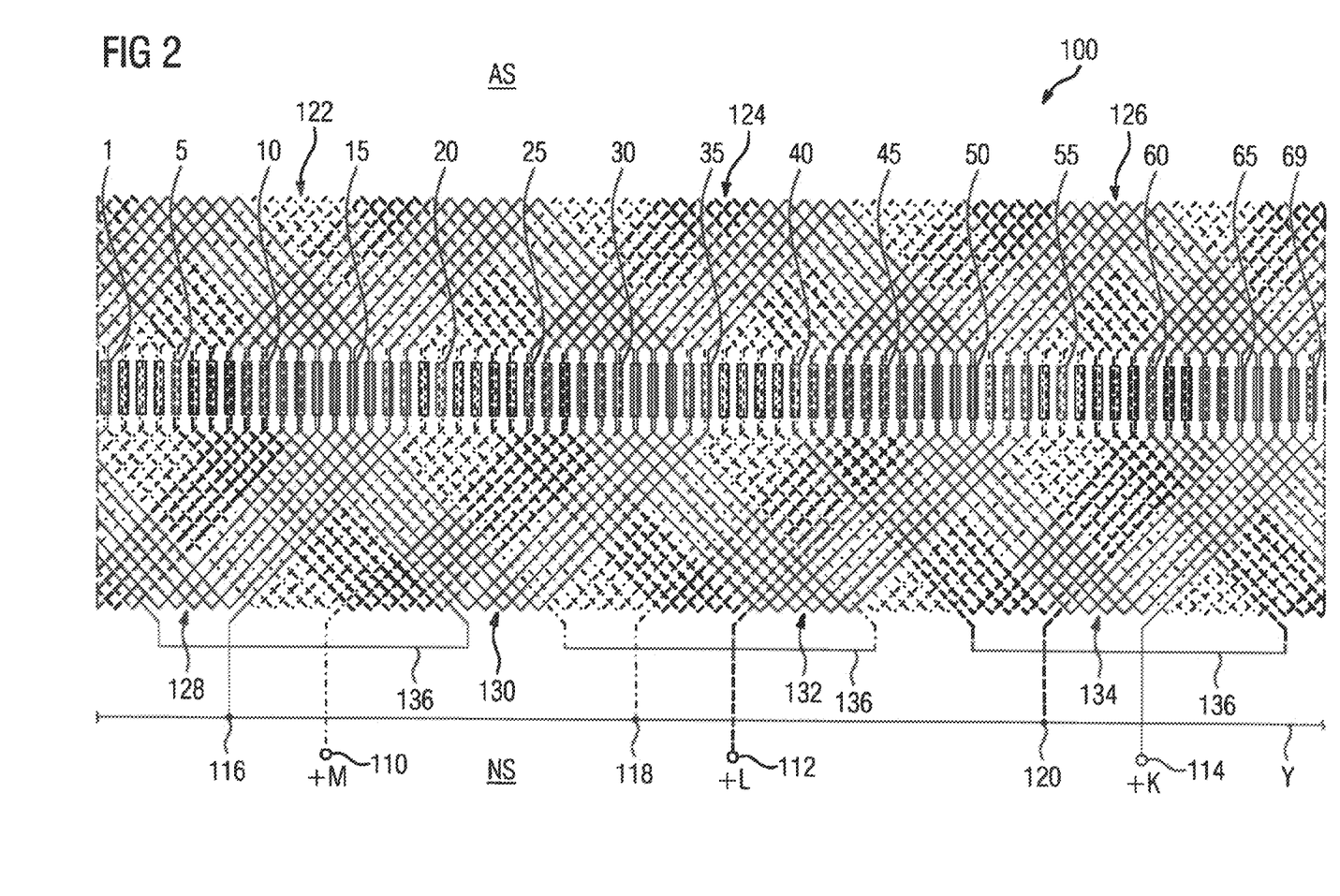
FIG. 2 a schematic circuit diagram of all three phases of the two-layer fractional-slot bar wave winding with a number of holes q2=5.75 in the rotor of a four-pole doubly fed asynchronous machine according to FIG. 1.
Figure 3:
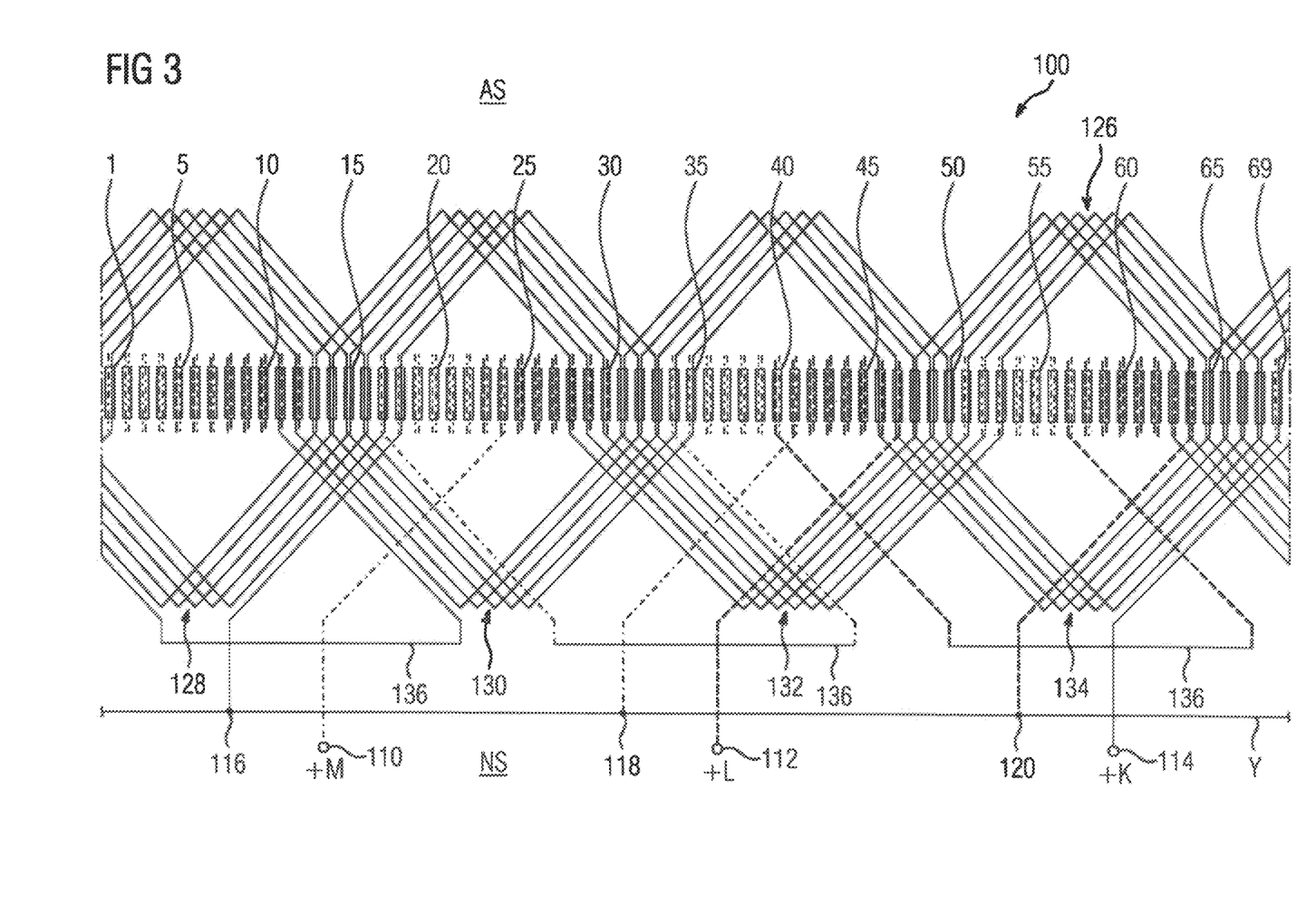
FIG. 3 a schematic circuit diagram as in FIG. 2, but in which only one phase is depicted for reasons of clarity.

FIGS. 1 to 3 schematically show a slot assignment and circuit diagrams of an example of a two-layer fractional-slot bar wave winding with a number of holes $q2=q+qZ/qN=5.75=5+\tfrac{3}{4}$ in the rotor 152 of the four-pole doubly fed asynchronous machine 140 with poles 101, 102, 103 and 104. Further, in FIGS. 2 and 3, an upper side corresponds to a drive side of a rotor 152, whereas an under side corresponds to a non-drive side of this rotor 152.

In the present case, the asynchronous machine 140 is formed as a three-phase machine with the rotor windings K, L, M. The non-drive side NS/NDE is provided with winding terminations +K, +L, +M that can be contacted via respective sliding contacts, not depicted, in the slip-ring unit of the rotor 152 of the doubly fed asynchronous machine 140 in order to supply electricity in a predeterminable manner to windings 122, 124, 126 assigned to the phases K, L, M which form the winding poles 162 to 172. In a star-delta circuit, the phase outputs 116, 118, 120 are connected to a common connection point Y, which hence forms a star point.

In FIG. 1, the assignments of the slots 1 to 69 are depicted in two rows. This figure shows the phase assignments and polarity of bars in the upper and lower layers of the winding in the respective slots 1 to 69. The slot numbers increase toward the right starting with slot number 1 thus simultaneously defining the positive direction of circulation of the winding. The respective upper layer of a slot 1 to 69 is designated OL and depicted above a respective lower layer UL.

The four coil groups 128, 130, 132, 134 are depicted by way of example for phase K. The lower layer UL of a coil group 128, 130, 132, 134 is located in the positive direction of circulation under the adjacent pole of the bars in the upper layer OL of the same coil group. However, herein, they are less than one pole pitch away from the bars in the upper layer OL of the same coil group.

In the present example, the pole pitch is 69/4=17.25 slots, whereas the coil span is 15 slots. The shortening of a distance between the upper and lower layer of a coil group by 17.25−15=2.25 slots compared to a diametral winding, because here the distance between the upper and lower layer of a coil group corresponds to the pole pitch, results in a chorded two-layer fractional-slot bar wave winding.

A shortened or lengthened step of the coils results in a wave winding with a long and a short connection end. Phase inputs 110, 112, 114 and the switching of phases K, L, M can be implemented on either the short or long connection end, but, with doubly fed asynchronous machines, are preferably arranged on a non-drive side NS. Assigned phase outputs are designated 116, 118, 120. In the present example, the long connection end is on the non-drive side NS and thus the short connection end is implemented on the drive side AS.

The special feature of this winding implementation compared to four-pole two-layer integral-slot bar wave windings consists in the different number of coils in the four coil groups 128, 130, 132, 134. With integral-slot windings, a coil group has a number of coils corresponding to the number of holes. With the present winding implementation where $q2=q+qZ/qN=5.75=5+\tfrac{3}{4}$, it may be derived from the slot assignment plan according to FIG. 1 that the winding has three coil groups with six coils 128, 130, 134 and one coil group with five coils 132.

FIGS. 2 and 3 are schematic circuit diagrams of a magnetically active unit 100 of a multiphase electric machine according to one embodiment, which, in the present case, is implemented as a doubly fed asynchronous machine. Herein, FIGS. 2 and 3 use the example from FIG. 1. FIG. 3 only shows the winding of the rotor phase K from FIG. 2.

By means of each of the windings 122, 124, 126, the magnetically active unit 100, in this case the rotor 152 of the doubly fed asynchronous machine 140 with a two-layer fractional-slot bar wave winding, is formed to create four magnetic poles 101, 102, 103, 104. The magnetically active unit 100 further has a laminated rotor core 154 comprising a plurality of slots, namely the slots 1 to 69. In FIGS. 2 and 3, the slots 1 to 69 are depicted schematically by narrow rectangles that are numbered accordingly.

The bars in the upper layer OL of the slots 1 to 69 are depicted by the lines on the right in the slots 1 to 69 whereas the bars in the lower layer UL of the slots 1 to 69 are depicted by the lines on the left in the slots 1 to 69.

In the present case, the asynchronous machine 140 is implemented as a three-phase asynchronous machine. Accordingly, the rotor 152 as a magnetically active unit 100 comprises exactly one of the windings 122, 124, 126 for each of the three phases K, L, M. In the present case, to form the magnetic poles 101, 102, 103, 104, the windings of the three phases K, L, M in each case have a single-phase input 110, 112, 114 and output 116, 118, 120. Thus, all the coil groups 128, 130, 132, 134 of the wave winding of the individual phases K, L, M are connected in series. In the present case, a parallel connection of coil groups 128, 130, 132, 134 would lead to an asymmetrical distribution, which should be avoided. The coils of the coil groups, for example 128, 130, 132, 134 of phase K, are arranged in an electrically insulated manner in the slots of the laminated core of the magnetically active unit.

In FIGS. 2 and 3, the phase input 114 of phase K 114 is implemented by the upper bar of the coil group 128 in slot 1. If the winding continues from here in a positive direction, initially the bars in the upper layer OL of the coil group 128, the bars in the lower layer UL of the coil group 128, the bars in the upper layer OL of the coil group 132 and the bars in the lower layer UL of the coil group 132 will be continued to an inversion bar 136. The inversion bar 136 is followed by the inverse, and hence negative, direction of circulation and in this sequence, the bars in the lower layer UL of the coil group 134, the bars in the upper layer OL of the coil group 134, the bars in the lower layer UL of the coil group 130 and the bars in the upper layer OL of the coil group 130 are continued to the phase output 116 of phase K.

In order in the present case to enable the implementation of the two-layer fractional-slot bar wave winding, the phase input in the positive direction of circulation should be selected in the upper bar of the coil group 128 lying furthest to the right if the phase inputs and circuit are arranged on the long connection end of the winding. In the positive direction of circulation, this coil group is two groups away from coil group 132, which is the only one with five coils and hence has one coil less than the three further coil groups 128, 130, 134. In the sixth and last wave path in the positive continuation of the wave winding, the coil group 132 is no longer continued, instead the inversion of the direction of circulation is completed in the lower bar of the coil group 128 lying furthest to the left and hence before coil group 132. Following the inversion of the direction of circulation, the other two coil groups 130 and 134 are continued to the phase output 116 in six wave trains corresponding to the number of coils in each coil group.

For rotor phases L and M, the winding is obtained in the same way by shifting the phase inputs by 23 slots (phase M—110) or 46 slots (Phase L—112).

A further implementation with the same slot assignments is obtained when the phase inputs of the rotor phase K are shifted in the positive direction of circulation to the upper bar of the coil group 134 lying furthest to the right. In the positive direction of circulation, this coil group is located directly before the coil group with q=5 coils. However, the upper bars of this coil group have the opposite polarity to that of the upper bars of coil group 128. This must be taken into account on contacting of windings. For rotor phases L and M, the winding is obtained by shifting in the same way as in the case described above.

Phase inputs and the circuit of the rotor winding can likewise be implemented on the short connection end. In this case, the coil span of a coil of a coil group 128, 130, 132, 134 is greater than the pole pitch. The phase input of the rotor phase K should then be selected in the upper bar of the coil group lying furthest to the right with q+1 coils, which in the positive direction of circulation is two groups away from the coil group with q coils. For the rotor phases L and M, the winding is obtained by shifting in the same way as in the case described above.

As a further option, the phase input of the rotor phase K on the short connection end can be selected in the upper bar of the coil group lying furthest to the right with q+1 coils, which, in the positive direction of circulation, lies directly before the coil group with q coils. For the rotor phases L and M, the winding is obtained by shifting in the same way as in the case described above.

Thus, the embodiments described describe a two-layer fractional-slot bar wave winding with a number of holes $q2=q+qZ/qN=5.75=5+3/4$ and allow the winding configuration to be influenced such that additional electric transformation ratios compared to pure integral-slot windings can be implemented in order hence to enable customer requirements to be met more precisely.

In the present case, the windings of the three phases 122, 124, 126 of the magnetically active unit 100 are implemented as two-layer bar wave windings. The multiphase winding can in principle also be implemented as a loop winding with preformed coils and the same slot assignments.

The exemplary embodiment serves exclusively to explain the invention and is not intended to restrict it. In particular, reference is made to the fact that, although the exemplary embodiment relates to a rotor of a four-pole doubly fed asynchronous machine, the number of poles can also be selected differently without departing from the concept of the invention. The invention is obviously equally applicable in a stator. In addition, the invention is not restricted to being used in doubly fed asynchronous machines but can obviously also be used accordingly in other rotating multiphase electric machines.

Such rotating multiphase electric machines are, for example, used as generators in wind turbines. Herein, according to the invention, the speed range or power requirement on the generator can be expanded or reduced. This enables better utilization to be made of a wind map of a wind turbine and/or the frequency converter of the wind turbine to be dimensioned more favorably.

What is claimed is:

1. A magnetically active unit of a rotating multiphase electric machine having at least two poles, comprising:
   a laminated core having a plurality of slots;
   at least one winding for a respective one of the phases of the rotating multiphase electric machine, said at least one winding including at least one electric conductor forming coil groups assigned to respective ones of the at least two poles, the at least one electric conductor arranged at least partially in an electrically insulated manner in a plurality of predetermined slots of the plurality of slots of the laminated core thus forming coils of the coil groups; and
   at least two sections of the at least one electric conductor of at least one of the windings arranged electrically insulated from one another in two radial layers with respect to an axis of the rotating multiphase electric machine in the plurality of predetermined slots, each layer formed by at least one of the electric conductors;
   wherein at least a first one of the coil groups of one of the windings has a first number of coils which is different from a second number of coils of a second one of the coil groups of the same winding and a first number of coils of a respective one of the coil groups is different from a second number of coils of a further coil group of the same phase.

2. The magnetically active unit of claim 1, wherein the at least two sections of the at least one electric conductor are arranged radially one above the other in a respective one of the plurality of predetermined slots and that a stack-like structure of the at least two sections of the at least one electric conductor is provided in the respective slot within an individual slot so that a good filling factor can be achieved.

3. The magnetically active unit of claim 1, further comprising a coil input of a respective one of the coil groups of at least one of the windings formed on a respective coil of an upper layer.

4. The magnetically active unit of claim 1, wherein at least one winding is formed as a two-layer preformed coil fractional-slot lap winding or fractional-slot bar wave winding.

5. The magnetically active unit of claim 1, wherein the windings are formed as preformed coil windings.

6. A stator for a rotating electric machine, said stator comprising a magnetically active unit as set forth in claim 1.

7. A rotor for a rotating electric machine, said rotor comprising a magnetically active unit as set forth in claim 1.

8. A rotating electric machine, comprising:
a stator; and
a rotor arranged in a rotatably mounted manner in an opening of the stator,
wherein at least one of the stator and the rotor includes a magnetically active unit, said magnetically active unit comprising a laminated core having a plurality of slots, at least one winding for a respective one of the phases of the rotating multiphase electric machine, said at least one winding including at least one electric conductor forming coil groups assigned to respective ones of the at least two poles, the at least one electric conductor arranged at least partially in an electrically insulated manner in a plurality of predetermined slots of the plurality of slots of the laminated core thus forming coils of the coil groups, and at least two sections of the at least one electric conductor of at least one of the windings arranged electrically insulated from one another in two radial layers with respect to an axis of the rotating multiphase electric machine in the plurality of predetermined slots, each layer formed by at least one of the electric conductors, wherein at least a first one of the coil groups of one of the windings has a first number of coils which is different from a second number of coils of a second one of the coil groups of the same winding and a first number of coils of a respective one of the coil groups is different from a second number of coils of a further coil group of the same phase.

9. The rotating electric machine of claim 8, constructed in the form of a doubly fed asynchronous machine.

10. The rotating electric machine of claim 8, wherein the at least two sections of the at least one electric conductor are arranged radially one above the other in a respective one of the plurality of predetermined slots and that a stack-like structure of the at least two sections of the at least one electric conductor is provided in the respective slot within an individual slot so that a good filling factor can be achieved.

11. The rotating electric machine of claim 8, further comprising a coil input of a respective one of the coil groups of at least one of the windings formed on a respective coil of an upper layer.

12. The rotating electric machine of claim 8, wherein at least one winding is formed as a two-layer preformed coil fractional-slot lap winding or fractional-slot bar wave winding.

13. The rotating electric machine of claim 8, wherein the windings are formed as preformed coil windings.

14. A wind turbine, comprising a rotating electric machine as set forth in claim 8.

* * * * *